Figure 1:
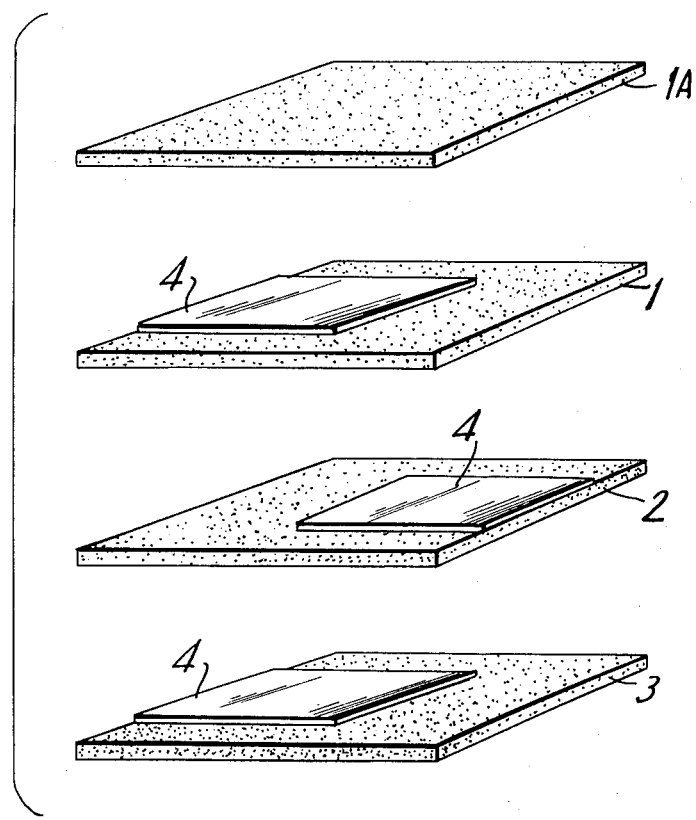

United States Patent
Buehler

[11] 3,757,177
[45] Sept. 4, 1973

[54] MONOLITHIC BASE METAL ELECTRODE CAPACITOR
[75] Inventor: Bert E. Buehler, Chatham, N.J.
[73] Assignee: Johanson Manufacturing Corporation, Boonton, N.J.
[22] Filed: Jan. 15, 1973
[21] Appl. No.: 323,989

[52] U.S. Cl............................... 317/258, 252/63.2
[51] Int. Cl............................................. H01g 1/01
[58] Field of Search..................... 317/258; 252/63.2

[56] References Cited
UNITED STATES PATENTS
3,534,238   10/1970   Buehler............................. 317/258

Primary Examiner—E. A. Goldberg
Attorney—Nichol M. Sandoe et al.

[57] ABSTRACT

A monolithic base metal electrode capacitor is provided comprising a dielectric of barium titanate containing about 15 percent to 25 percent of $MnO_2$, 0.5 percent to 2 percent $Fe_2O_3$, 0.1 percent to 1 percent $CeO_2$, and an effective amount of up to about 2 percent by weight of $CaZrO_3$ sufficient to increase K to a value markedly in excess of 1,200 referred to room temperature. Between thin layers of the dielectric are interleaved deposited films of a base metal electrode, such as Ni, Co, Fe and alloys thereof, the edges of alternate films of the electrode being mechanically and electrically joined.

5 Claims, 2 Drawing Figures

PATENTED SEP 4 1973　　　　　　　　　　　　　　　3,757,177

MONOLITHIC BASE METAL ELECTRODE CAPACITOR

STATE OF THE ART

In my U.S. Pat. No. 3,534,288, I disclose a base metal electrode capacitor which utilizes the high permittivity of a dielectric, such as barium titanate, in the construction of very small capacitors, for example, micro-capacitors. Such capacitors are used extensively in modern electronic applications in which the conservation of weight and space is a very essential requirement. Examples of such applications are guided missiles, ballistic missiles, satellites, and the like.

Generally speaking, the capacitor is produced by shaping the dielectric into thin sheets. Thus, in one prior art embodiment, the barium titanate, when fired in single sheet form, is usually electroded with silver, this being accomplished in a second firing at a relatively low temperature following the initial firing of the barium titanate at relatively high temperature. The two firings are not accomplished simultaneously since the silver cannot withstand the much higher barium titanate firing temperature. Silver is the only noble metal cheap enough to make simultaneous sintering of electrodes and dielectric economic, but to use it in this way would necessitate developing a high permittivity dielectric sintering technique below 900° C which, to date, has not been available.

The production of monolithic capacitors (that is multi-layered capacitors) presents a different problem in that stacked layers of the dielectric are interleaved with thin films of electrode material such that the electrode films are within the dielectric, necessitating the simultaneous firing of both ceramic and electrode. The whole assemblage is then subjected to a high temperature firing. Silver cannot be used in this way. The only known alternative is to use high melting point precious metals such as platinum, palladium, and the like, as these metals can withstand temperatures as high as 1,300° C and higher and resist oxidation. However, using these metals renders the capacitors more expensive.

Thus, in my U.S. Pat. No. 3,534,238, I disclose a technique which obviates the necessity of using high melting point precious metals (e.g. platinum, palladium, and the like) and which successfully employs base metal electrodes selected from the group consisting of nickel, cobalt, iron and alloys thereof. These metals are advantageous in that they are capable of withstanding firing temperatures substantially in excess of 900° C, for example, at 1,300° C under inert conditions, such as in nitrogen. Moreover, the use of base metal electrodes has economic advantages in that they are much less expensive than the precious metals and thus obviate the need of maintaining high inventories of precious metals in stock.

I therefore proposed the use of a dielectric composition containing at least 72 percent by weight of barium titanate together with about 15 percent to 25 percent $MnO_2$, about 0.5 percent to 2 percent $Fe_2O_3$ and about 0.1 percent to 1 percent $CeO_2$, a preferred narrow composition range being one containing by weight about 18 percent to 20 percent $MnO_2$, about 0.5 percent to 1 percent $Fe_2O_3$, about 0.1 percent to 0.5 percent $CeO_2$ and the balance at least about 78 percent barium titanate ($BaTiO_3$).

In working with a preferred composition containing approximately the following by weight: 79 percent $BaTiO_3$, 19.8 percent $MnO_2$, 1 percent $Fe_2O_3$ and 0.2 percent $CeO_2$, markedly improved electrical properties were noted characterized by a K value of about 1,200 at about room temperature, the foregoing value being retained at a variation of about ±15 percent over the temperature range of about −20° to 150° C and at a variation of about ±20 percent over the temperature range of about −50° C to 150° C.

It would be desirable to improve markedly the K value of the foregoing compositions to meet the demands in the field for smaller and smaller capacitors.

I have now found that I can provide a base metal electrode capacitor of the foregoing type having desirable electrical properties, particularly markedly improved K, provided steps are taken to modify the composition by adding to said composition an effective amount of $CaZrO_3$.

OBJECTS OF THE INVENTION

It is thus the object of this invention to provide a method for producing a base metal electrode capacitor.

Another object is to provide a base metal electrode capacitor characterized by a markedly improved K value at room temperature.

A still further object is to provide a base metal electrode capacitor in which the dielectric is substantially barium titanate containing controlled amounts of manganese dioxide, iron oxide, cerium oxide and an effective amount of $CaZrO_3$.

Figure 2:
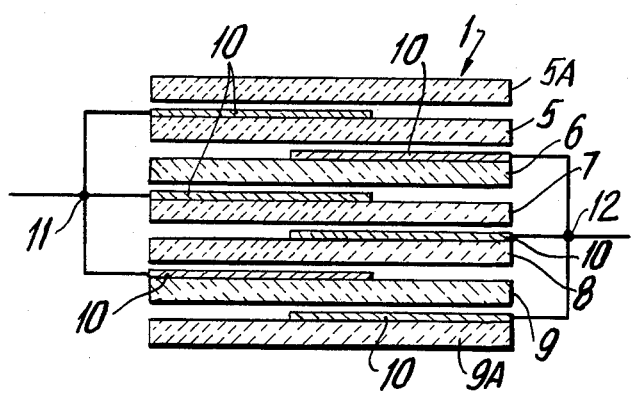

These and other objects will more clearly appear when taken in conjunction with the following description and the accompanying drawing, wherein:

FIG. 1 is an exploded view showing thin layers of ceramic, each containing a base metal electrode film; and FIG. 2 is a schematic representation in cross section of layers of ceramic interleaved with films of base metal electrode.

As stated hereinbefore, one of the advantages of using barium titanate as a dielectric is that, because of its high permittivity, it can be employed in the form of very thin sheets. A known process comprises dispersing ceramic particles of the dielectric in an organic vehicle sufficient to form a film on, for example, a flat plate of glass, such that on drying, the film is strong enough to be peeled off and cut into pieces of convenient size. Each of the pieces is then painted with an organic dispersion of electrode metal particles, the areas painted being staggered from piece to piece so that when the painted layers are dried and stacked, alternate layers of the electrode film will extend from one edge of the stack, while the remaining alternate layers will extend from the opposite edge of the stack (note FIG. 1). The stackS are then fired at an elevated temperature, for example, of about 1,300° C.

I have found that I can markedly improve the K value of the composition disclosed in my U.S. Pat. No. 3,534,238 by adding to the composition an effective amount of $CaZrO_3$ ranging up to about 2 percent by weight sufficient to upgrade the K value at room temperature. Preferably, the amount of $CaZrO_3$ may range from about 0.75 percent to 2 percent and, more preferably, from about 1 percent to 2 percent.

Thus, broadly speaking, the composition may contain by weight at least 72 percent $BaTiO_3$, about 15 percent to 25 percent $MnO_2$, about 0.5 percent to 2 percent $Fe_2O_3$, about 0.1 percent to 1 percent $CeO_2$ and an amount of $CaZrO_3$ ranging up to about 2 percent effective to increase the normal K value of the material before the addition of $CaZrO_3$. A more preferred range is one containing by weight about 18 percent to 20 percent $MnO_2$, about 0.5 percent to 1 percent $Fe_2O_3$, about 0.1 percent to 0.5 percent $CeO_2$ and about 0.75 percent to 2 percent $CaZrO_3$ (preferably about 1 percent to 2 percent) and the balance essentially $BaTiO_3$, e.g. at least about 78 percent.

A preferred composition is one containing approximately the following by weight: 78.5 percent $BaTiO_3$, 18.6 percent $MnO_2$, 0.9 percent $Fe_2O_3$, 0.2 percent $CeO_2$ and 1.8 percent $CaZrO_3$.

The preferred composition is initially mixed in ethylene dichloride for about 12 hours, dried and then calcined in air for two hours at 1,100° C. After cooling, the calcined material is remixed in the same liquid for a period of about 8 hours and then dried again. After the second drying, the material is mixed with an organic binder of acryloid plastic dispersed in ethylene dichloride, the binder comprising about 45 percent by weight of the total sheet. Individual pieces are punched out and a thin film of electrode nickel applied to each of the pieces. The nickel is applied as a slurry of carbonyl nickel powder dispersed through a carrier of ethyl cellulose in terpineol. After drying, the filmed pieces are stacked one on top of the other to form a capacitor assembly. Opposite edges of the stack (note FIG. 2) are provided with a thin film of the same metal as the electrode, e.g. nickel powder applied as a slurry to provide electrode connection. The assembly is then sintered in an inert atmosphere, such as nitrogen, at a temperature of about 1,300° C, for about 1 hour. Thus, electrode connection is achieved simultaneously with the high temperature sintering of the assembly.

An advantage of using nickel cobalt, and the like base metal for electrode connection is that the metal is directly solderable, thus alleviating the need for applying silver to the edge electrode in a second firing. In the case of a platinum or palladium metal electroded capacitor, a second firing is necessary since neither platinum nor palladium can be soldered to directly.

Referring to FIG. 1, an exploded array of a capacitor assembly is shown comprising ceramic layers 1A, 1, 2 and 3, each having applied to the surface thereof a film of electrode nickel 4 as shown. Layer 1A is a cover plate and along with layer 3 essentially seals off the internal electrodes.

In FIG. 2, a completed capacitor is shown comprising ceramic layers 5A, 5, 6, 7, 8, 9 and 9A, having interleaved therebetween a plurality of electrode films 10 of a metal from the group nickel, cobalt, iron and alloys thereof, the metal in this instance advantageously being nickel. As will be noted, alternate layers or films of nickel are electrically coupled together at 11 on the one hand, while the remaining alternate layers of the electrode metal are coupled at 12 on the other hand.

The base metal electrode capacitor exhibits properties comparable to and in some instances better than prior barium titanate capacitors using platinum as the electrode metal. The capacitor of the invention (approximately 78.5 percent $BaTiO_3$, approximately 18.6 percent $MnO_2$, approximately 0.9 percent $Fe_2O_3$, approximately 0.2 percent $CeO_2$ and approximately 1.8 percent $CaZrO_3$) possesses a K of about 1,800 at about 25° C which is retained at a maximum variation of about ± 15 percent over the temperature range of about −60° to 130° C. This is a marked improvement over the K value obtained for the preferred composition (K = 1,200 at room temperature) disclosed in my U.S. Pat. No. 3,534,238 (79 percent $BaTiO_3$, 19.8 percent $MnO_2$, 1 percent $Fe_2O_3$ and 0.2 percent $CeO_2$). Thus, the addition of an effective amount of $CaZrO_3$ ranging up to about 2 percent to the preferred composition provides unexpected new and improved results. The new composition of the invention also provides comparable results similar to the patent with respect to the dissipation factor, capacitance change as a function of frequency over the range of 1 kc to 10 mc, dissipation loss as a function of frequency, and so forth.

When the $CaZrO_3$ content substantially exceeds 2 percent by weight, the variation in K tends to broaden and may range from +15 percent to as low as −25 percent over the temperature range of about −50° to 150° C.

In working over the composition range of the dielectric, the effective amount of $CaZrO_3$ added thereto should be at least sufficient to improve the K factor at 25° C by at least about 20 percent.

Examples of other compositions of the modified dielectric falling within the ranges disclosed hereinbefore are as follows:

| Example | Percentages | | | | |
|---|---|---|---|---|---|
| | $BaTiO_3$ | $MnO_2$ | $Fe_2O_3$ | $CeO_2$ | $CaZrO_3$ |
| 1 | 76.5% | 20.25% | 2% | 0.5% | 0.75% |
| 2 | 75 | 22 | 1.0 | 0.7 | 1.3 |
| 3 | 79 | 18.15 | 0.8 | 0.3 | 1.75 |

Alloys of the metals nickel, cobalt and iron that may be used as electrode material in addition to the individual metals are: 52 percent Ni–48 percent Fe, 80 percent Ni–20 percent Fe, 50 percent Ni–50 percent Co, 50 percent Co–50 percent Fe, 80 percent Ni–20 percent Co, 34 percent Ni–33 percent Co–33 percent Fe, and the like.

As stated hereinabove, in producing capacitors in accordance with the invention, I find it advantageous to conduct the high temperature firing in an inert atmosphere, such as nitrogen. While I prefer to use a sintering temperature of about 1,300° C, the temperature may range from about 1,280° C to as high as 1,400° C.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims. composition 25

What is claimed is:

1. A method of improving the K value of a dielectric composition consisting essentially by weight of about 15 percent to 25 percent $MnO_2$, about 0.5 percent to 2 percent $Fe_2O_3$, about 0.1 percent to 1 percent $CeO_2$ and the balance essentially at least about 72 percent $BaTiO_3$ which comprises incorporating in said composition an amount of up to about 2 percent by weight of $CaZrO_3$ effective to raise the K value of said composition at least about 20 percent.

2. The method of claim 1, wherein the dielectric composition consists essentially by weight of about 18 percent to 20 percent $MnO_2$, about 0.5 percent to 1 percent $Fe_2O_3$, about 0.1 percent to 0.5 percent $CeO_2$ and the balance essentially at least about 78 percent BaTiO₃ and wherein CaZrO₃ is incorporated in said composition in an amount ranging from about 0.75 percent to 2 percent.

3. As an article of manufacture, a base metal electrode capacitor comprising a plurality of layers of a ceramic composition fired together, said layers of ceramic having interleaved therebetween films of a base metal electrode selected from the group consisting of nickel, cobalt, iron and alloys thereof, alternate films of said metal electrode being electrically coupled together, the composition of said ceramic consisting essentially by weight of about 15 percent to 25 percent $MnO_2$, about 0.5 percent to 2 percent $Fe_2O_3$, about 0.1 percent to 1 percent $CeO_2$, an effective amount of $CaZrO_3$ up to about 2 percent sufficient to increase K at least about 20 percent, and the balance essentially at least about 72 percent $BaTiO_3$.

4. The article of manufacture of claim 3, wherein the electrode metal is nickel and wherein the ceramic consists essentially by weight of about 18 percent to 20 percent $MnO_2$, about 0.5 percent to 1 percent $Fe_2O_3$, about 0.1 percent to 0.5 percent $CeO_2$, about 0.75 percent to 2 percent $CaZrO_3$, and the balance essentially at least about 78 percent by weight of $BaTiO_3$.

5. The article of manufacture of claim 4, wherein the ceramic consists essentially of approximately 78.5 percent $BaTiO_3$, approximately 18.6 percent $MnO_2$, approximately 0.9 percent $Fe_2O_3$, approximately 0.2 percent $CeO_2$ and approximately 1.8 percent $CaZrO_3$.

* * * * *